United States Patent [19]

Kohno et al.

[11] Patent Number: 4,956,540
[45] Date of Patent: Sep. 11, 1990

[54] ARC SPOT WELDING APPARATUS

[75] Inventors: Mitsuo Kohno, Itami; Masao Sakai, Yokohama; Moritoshi Nagasaka, Ibaragi; Toshihiko Okada, Takatsuki; Hiroyuki Morimoto, Itami, all of Japan

[73] Assignee: Daihen Corporation, Osaka, Japan

[21] Appl. No.: 385,894

[22] Filed: Jul. 26, 1989

[30] Foreign Application Priority Data

Jul. 29, 1988 [JP] Japan .................. 63-101888[U]
Nov. 22, 1988 [JP] Japan .................. 63-151941[U]
Jan. 11, 1989 [JP] Japan .................. 1-001848[U]

[51] Int. Cl.$^5$ .............................................. B23K 9/007
[52] U.S. Cl. .................................................. 219/127
[58] Field of Search ........................... 219/127, 137 R

[56] References Cited

U.S. PATENT DOCUMENTS

| | | | |
|---|---|---|---|
| 2,498,241 | 2/1950 | Bowen | 219/137 R |
| 2,845,524 | 7/1958 | Morley, Jr. et al. | |
| 3,132,240 | 5/1964 | McCartney | 219/127 |
| 3,366,773 | 1/1968 | Edge et al. | |
| 3,617,688 | 11/1971 | Fogelstrom | |
| 4,601,151 | 7/1986 | Nunley et al. | 219/127 |
| 4,731,518 | 3/1988 | Parmelee et al. | |

*Primary Examiner*—Clifford C. Shaw
*Attorney, Agent, or Firm*—Scully, Scott, Murphy & Presser

[57] ABSTRACT

There is disclosed an arc spot welding apparatus comprising a welding power supplying unit, a wire feeder connected to the welding power supplying unit by a control cable and an arc spot welding torch connected to the wire feeder by a torch cable which is operable by operating an operation switch arranged on a holder thereof to be held by an operator being characterized in that the welding torch is comprised of a nozzle assembly providing a nozzle and a power supply element, a torch holder assembly and a torch body assembly connecting said nozzle assembly and said torch holder assembly which is formed to have a length so that the operator can operate said welding torch in a standing posture.

5 Claims, 9 Drawing Sheets

ARC SPOT WELDING APPARATUS

BACKGROUND OF THE INVENTION

1. Field of the Invention

The present invention relates to an arc spot welding torch for arc spot welding in which an operation switch of a holder activates the torch by pressing a nozzle of the welding torch onto a workpiece.

2. Description of the Related Art

Generally speaking, the target workpiece to be arc spot welded may have various shapes such as a narrow and complicated shape, vertical a wall in a box and the like. Arc spot welding torches for general use which are commercially available are made small in shape in order to meet various targets.

Figure 14:
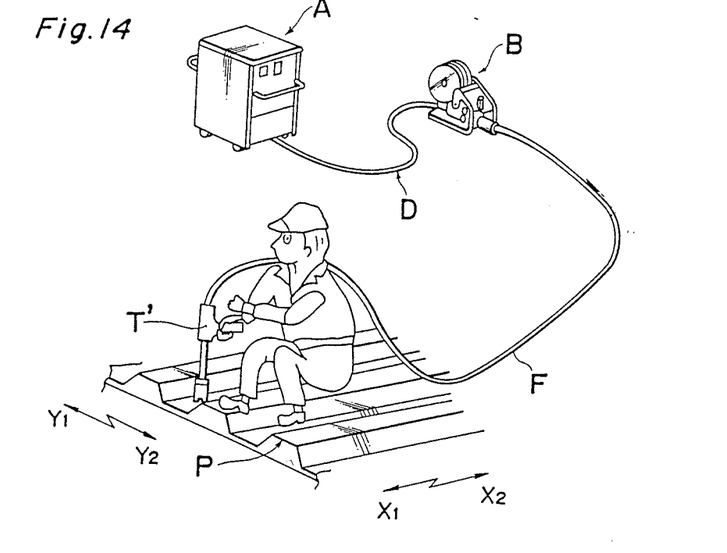

In the meanwhile, arc spot welding apparatuses as shown in FIG. 14 are on the market for building constructions such as deck plates of electric cars or architectural structures. The arc spot welding apparatus is comprised of a power source unit A for supplying electric power for welding, a wire feeder B for feeding electrode wire which is connected to the power source unit A by a control cable D, and an arc spot welding torch T' which is connected to the wire feeder B by a torch cable F.

Figure 15:
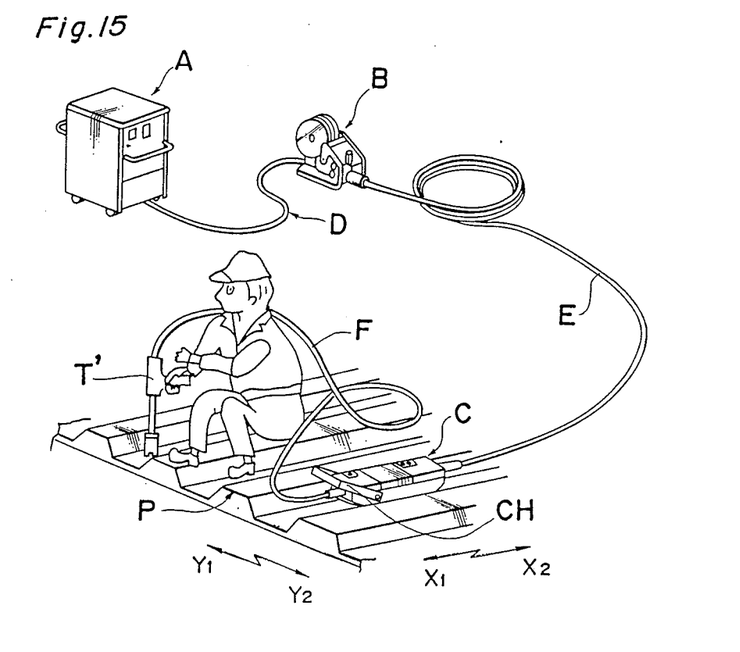

Arc spot welding apparatuses as shown in FIG. 15 are also on the market. This type of arc spot welding apparatus further comprises one more wire feeder C to be arranged near the welding torch T' which is connected to the wire feeder B and the arc spot welding torch T' by an intermediate cable E and a torch cable F, respectively. This wire feeder C contributes to rise the feeding power of the electrode wire and, thereby, the working area can be widened.

Figure 17:
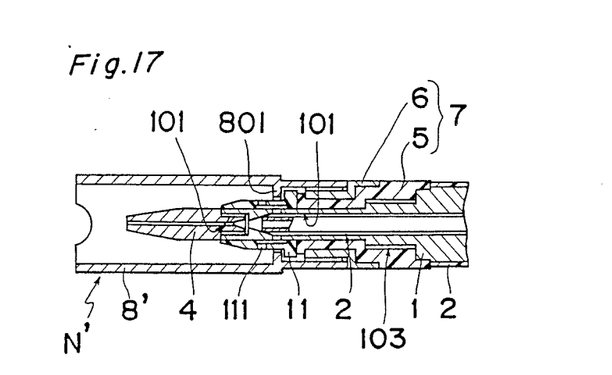
FIG. 17 is an enlarged sectional view of the tip end portion of the welding torch shown in FIG. 14 or 15.

As shown in FIG. 17, the welding torch used in the welding apparatus comprises a power supply element 4 for supplying electric power to a welding electrode, a baffle 11 having small apertures 111 for spouting shield gas and a nozzle 8' enclosing the welding electrode and the power supply element 4 at the tip end thereof. Upon welding, the nozzle 8' is abutted onto a target work and an arc is generated by supplying electric power between the welding electrode and the target work via the power supply element 4.

In the meanwhile, upon arc spot welding, it is necessary to make an upper metal plate, stick to a lower metal plate, namely a base metal by the upper metal plate with the nozzle since the upper metal plate is piled on the base metal and is melted to weld to the base metal.

As shown in FIGS. 14 and 15, since both welding torches T' used for the welding apparatus are relatively small by the reason mentioned above, the operator has to bend himself or his knees to operate the welding torch upon arc spot welding. Since a time necessary for arc spot welding one spot is a few seconds at the most, such an unstable posture as mentioned above may be considered to be acceptable. But a relatively heavy quota is assigned to the operator because of the shortness of welding time per one spot. In the operation of the welding apparatus, the operator will walk from one spot to the next spot to be welded and bend himself for actual arc spot welding in a short time and, therefore, becomes very fatigued in order to finish his quota assigned to him.

Further, it becomes difficult to press the upper plate onto the base metal plate with a reasonable force in the bent posture, especially when the operator may become fatigued. This may invite dangerous weld defects which are difficult to find in appearance after the welding.

Figure 16:
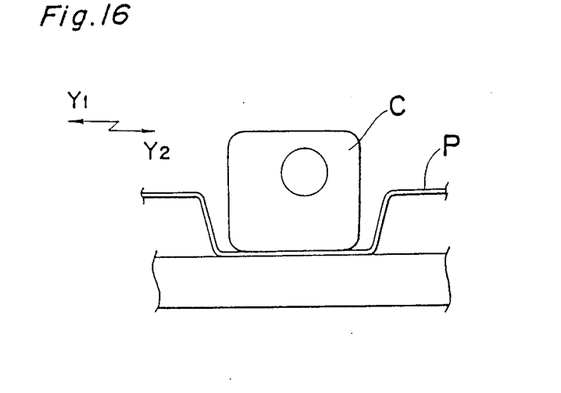
FIG. 16 is a side view of the second wire feeder shown in FIG. 15.

In the welding operation for welding a deck plate P, as shown in FIGS. 15 and 16, the operator moves along a groove of the deck plate P, namely in X direction, to weld individual spots while putting the wire feeder C of the torch side in another groove. The wire feeder is moved along the groove by pulling the torch cable F. When the welding operation with respect to one groove is finished, the operator moves to the next groove to be welded in Y direction. If it becomes necessary to move the wire feeder C for the next welding operation, the operator has to bring it up by grasping the handle CH thereof in order to move it to a suitable groove on the deck plate. However, the operator is apt to pull the torch cable F in order to move the wire feeder C forcibly. This invites falling of the wire feeder C and/or cutting of the torch cable F.

On the other hand, so called sputters being molten metal of several hundred degrees (°C.) are generated during the arc spot welding operation and almost of them adhere to the inner surface of the nozzle N', as shown in FIG. 17, since it is pressed onto the upper plate. If the amount of sputters adhered increases, various inconveniences such as turbulence of the shield gas flow, and electrical short circuit between the nozzle N' and the power supply element 4 may be caused. In order to avoid these inconveniences, it becomes necessary to remove adhered sputters on the way of the welding operation. However, the removing operation of the adhered sputters is laborious because it has to be done after detaching the nozzle N'. Further, it is impossible to observe a state of adhesion of the sputter from the outside and, thereby, an opportunity for removing the adhered sputters is apt to lose. This causes various inconveniences mentioned above. In order to decrease the adhesion amount of sputters, there has been known a method wherein the tip end portion of the welding torch is immersed beforehand into a liquid for preventing sputters from adhering. However, if this method is performed as it is, the liquid is prevented from going inside of the nozzle N' by the air remaining in the nozzle N' and, thereby, it is not spread inside of the nozzle sufficiently. Thus, it fails to prevent sputters from adhering. If the nozzle N' and elements 4 and 11 of the tip and of the welding torch T' are immersed into the liquid after detaching the nozzle from the welding torch, it becomes possible to prevent sputters from adhering satisfactorily but the immersing operation becomes laborious since the nozzle has to be detached from the welding torch at that time.

SUMMARY OF THE INVENTION

One of objects of the present invention is to provide an arc spot welder which is operable in a standing posture.

Another object of the present invention is to provide an arc spot welder which is easy to move.

One more object of the present invention is to provide an arc spot welder which is able to prevent sputters from adhering to the nozzle.

In order to accomplish these objects, according to the present invention, there is provided an arc spot welding apparatus comprising a welding power supplying unit, a wire feeder connected to the welding power supplying unit by a control cable and an arc spot welding torch connected to the wire feeder by a torch cable which is operable by operating an operation switch arranged on a holder thereof to be held by an operator being characterized in that the welding torch is comprised of a nozzle assembly providing a nozzle and a power supply element, a torch holder assembly and a torch body assembly connecting said nozzle assembly and said torch holder assembly which is formed to have a length so that the operator can operate said welding torch in a standing posture.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Figure 1:
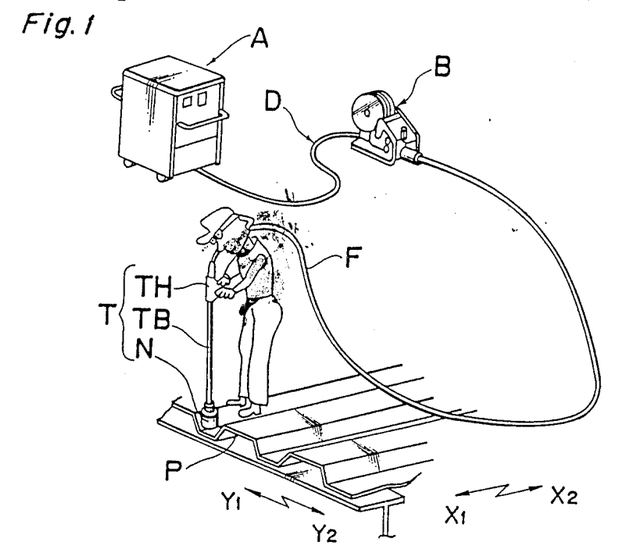
FIG. 1 is a perspective view of an arc spot welder according to the first preferred embodiment of the present invention.

FIG. 1 shows an arc spot welder according to the first preferred embodiment of the present invention.

The arc spot welder is comprised of a power source unit A for supplying electric power thereto, a wire feeder B for feeding an electrode wire and a welding torch T for arc spot welding. The wire feeder B is connected to the power source unit by a control cable D and the welding torch T is connected to the wire feeder B by a torch cable F.

The welding torch T is comprised of a nozzle assembly N to be abutted onto a work P, a torch holder assembly TH held by an operator and a torch body assembly TB connecting the nozzle assembly N to the torch holder assembly TH. The torch body assembly TB is formed to have such a length that the operator can operate the welding torch T in standing posture.

Figure 2:
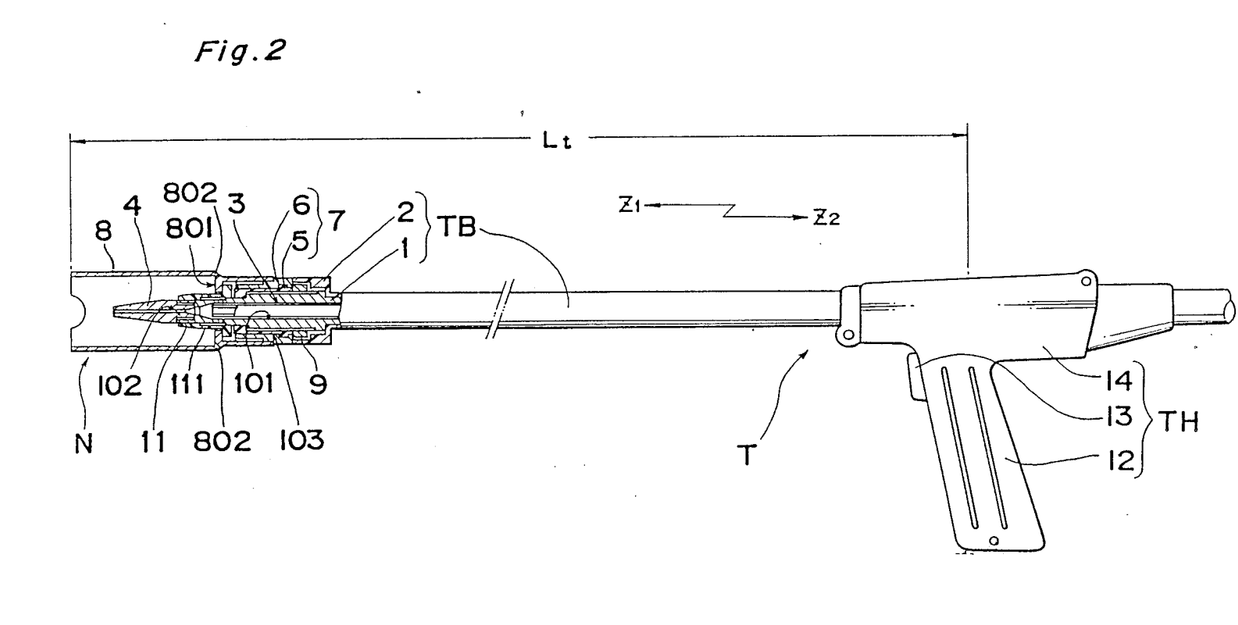
FIG. 2 is a partially sectioned front view of the welding torch of the arc spot welder shown in FIG. 1 or 5.

FIG. 2 shows the welding torch T.

The torch body assembly TB is comprised of an elongated torch body 1 and an insulation tube 2 covering the elongated torch body 1 from the outside thereof. The elongated torch body 1 has a hole 101 passing therethrough in the axial direction $Z_l$ thereof and male and female screws 102 and 103 are threaded on the inner and outer surfaces of the free end portion of the torch body 1. The torch body 1 has a guide tube 3 for guiding an electrode wire which is interchangeably fitted into the hole 101. This guide tube 3 is provided for prolonging the life of the welding torch. However, it may be omitted.

There are provided at the tip end side of the welding torch a power supply element 4 fitted to the female screw 103, an inner cylinder 5 made of an electrically insulative material such as ceramic which has a female screw fitted to the male screw 102 of the torch body 1 and an outer cylinder 6 supported by the tip end of the torch body together with the inner cylinder 5. The inner and outer cylinders 5 and 6 form an electrically insulative cylinder 7. A nozzle 8 made of a metal is detachably mounted on the outer cylinder 6 of the insulative cylinder 7 for example by engaging a screw of the nozzle 8 with a screw of the outer cylinder 6. The insulative cylinder 7 is fastened by a nut 9 which is fitted to the male screw 102 of the torch body 1. A baffle 11 for a shield gas is fixed to the bottom wall 801 of the nozzle 8 and the shield gas supplied into the torch body 1 is spouted into the nozzle 8 through a gas spouting hole 111 formed in the baffle 11. A small hole 802 is provided on the bottom wall 801 of the nozzle 8 in order to release the air in the nozzle 8 to atmosphere which is inclined to the axis of the welding torch. It is desirable to provide two or three holes 802 on the bottom wall 801 at equal angular pitch. The hole 802 has a diameter of 1 to 6 mms though it is dependent on the inner diameter of the nozzle 8 and, the quantity of supply of the shield gas. The nozzle assembly N is comprised of elements from 4 to 11 mentioned above. The torch holder assembly TH provides a holder 12 to be held by the operator, an operation switch 13 to be operated upon the welding operation and a holder body 14 for supporting the torch cable F.

The length Lt of the welding torch T is designed so as to be able to operate it in standing posture holding the holder 12. Upon welding, the shield gas is supplied in the nozzle 8 and an electric power is supplied, via the power supply element 4, to the electrode wire being fed by the wire feeder B in order to generate an arc. In practice, the length Lt of the welding torch T is set desirably at 650 mms which is about three times of the length of the conventional arc spot welder. Thereby, the operator can operate the welding torch T in the standing posture as shown in FIG. 1. In other words, the operator can operate it without need of bending himself and, therefore, the fatigue of the operator is minimized. Further, it becomes possible to press the workpiece P with a reasonable force and, therefore, a reasonably high quality of the arc spot welding.

Figure 3:
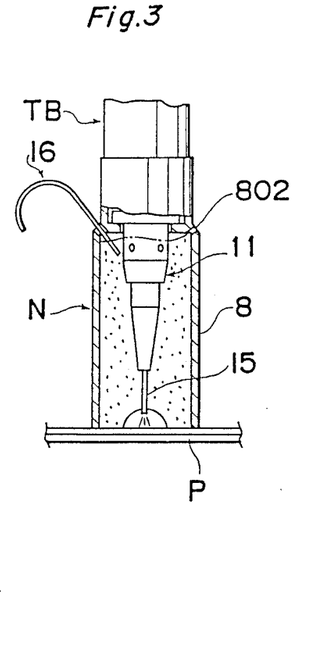
FIG. 3 is a partially sectioned front view of the nozzle of the welding torch for showing a state of use.

On the other hand, sputters generated in the arc spot welding gradually adhere to the inner surface of the nozzle 8 and it becomes necessary to remove those sputters adhered at an appropriate timing. According to the preferred embodiment of the present invention, a strong light of the arc generated in the arc spot welding can be observed through small hole 802 provided on the bottom of the nozzle 8. Since the arc light leaked out from the small hole 802 decreases in the intensity thereof gradually as the amount of adhesion of sputters increases, the operator can catch the amount of the adhered sputters from a light amount of leakage and thereby, it becomes possible to remove the adhered sputters at an appropriate timing. Further, since the sputters adhered to the nozzle 8 and the baffle 11 are easily peeled off, it becomes possible to remove the sputters using a stick 16 inserted through the small hole 802, as shown in FIG. 3.

Figure 4:
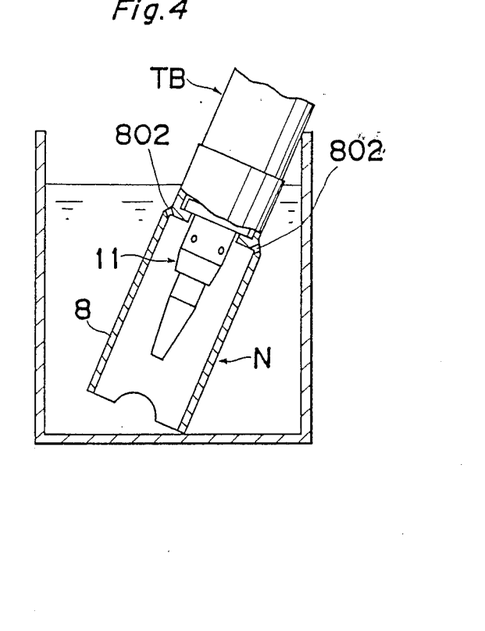
FIG. 4 is a partially sectioned front view of the nozzle of the welding torch for showing a state thereof immersed into a liquid for preventing sputters from adhering.

Moreover, the small hole 802 serves to release the air in the nozzle 8 upon immersing the tip end of the welding torch in the liquid for preventing sputters from adhesion, as shown in FIG. 4. Thus, the liquid is widely spread on the whole of the inner surface of the tip end of the welding torch and, thereby, sputters are effectively prevented from adhesion. Also, the immersing operation can be done quite easily since it is unnecessary to detach the nozzle from the welding torch beforehand.

Next, the second preferred embodiment of the present invention will be explained with reference to FIGS. 5 to 8.

Figure 5:
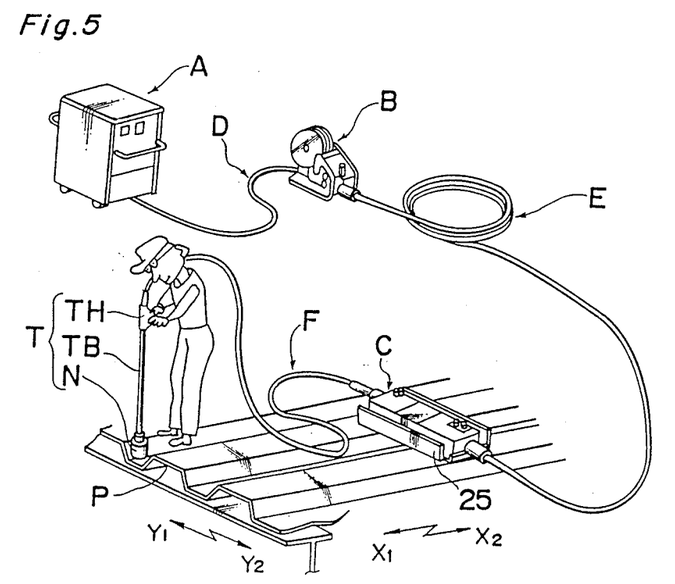
FIG. 5 is a perspective view of an arc spot welder according to the second preferred embodiment of the present invention.

As is apparent from comparison of FIG. 5 to FIG. 1, the arc spot welding apparatus according to the second preferred embodiment further comprises another wire feeder C of the pull type to be arranged near the operator which is connected to the main wire feeder B and the welding torch T by an intermediate cable E and a torch cable F, respectively. The welding torch T is same as that shown in FIG. 2.

Accordingly, the second preferred embodiment is characterized by the structure of the wire feeder C.

Figure 6:
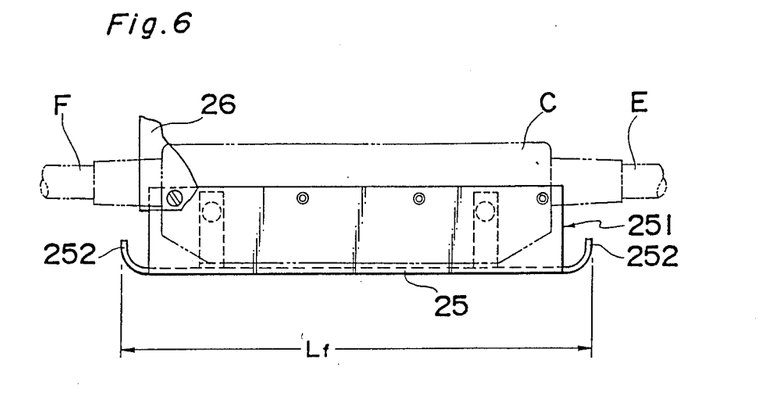
FIG. 6 is a front view of the second wire feeder shown in FIG. 5.
Figure 7:
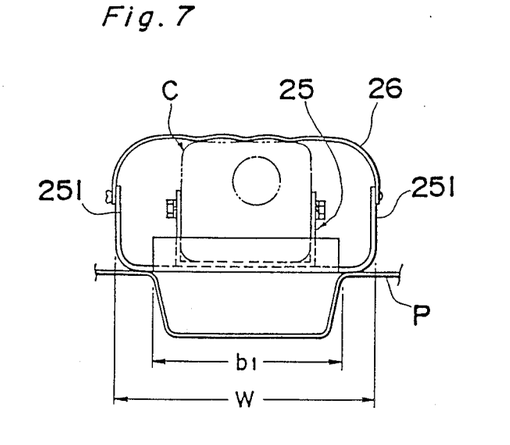
FIG. 7 is a side view of the second wire feeder.
Figure 8:
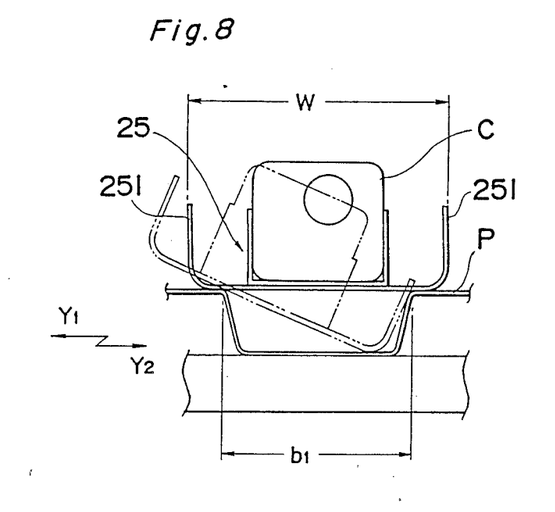
FIG. 8 is a side view of the second wire feeder for showing a state of use.

As shown in FIGS. 6 and 7, the wire feeder C comprises a guard member 25 having a wide bottom plate which is detachably mounted thereto so as to cover the bottom surface of the main body of the wire feeder C. The width W and length $L_f$ are determined so as to be larger than the maximum width $b_l$ of the groove of the deck plate P ($W > b_l$, $L_f > b_l$). At respective ends in the width wise direction of the bottom plate, rising portions 251 and 251 are provided for mounting the bottom plate to the main body of the wire feeder C and, also, two curved portions 252 and 252 are provided at respective ends in the lengthwise direction of the bottom plate in order to guide the wire feeder C on the deck plate smoothly. The upper surface of the wire feeder C is covered by a cover plate 26 for water proofing which is hinged at one end in the lengthwise direction of the wire feeder C and the other end of which is supported by the guard member 25 free from opening and closing. Thus, the wire feeder C can be moved on the deck plate P by pulling the torch cable F. The width W of the guard element 25 is desirably set at a value of $[b_l + (50 \sim 100)]$ mms. In this case, the wire feeder C may drop in the groove of the deck plate P upon pulling it around. However, the wire feeder C is merely inclined in the groove because of the rising portion 251, as is indicated by a phantom line in FIG. 8 and it is still movable in a desirable direction easily by pulling the torch cable F. The rising portions 252 can be omitted if the length $L_f$ of the bottom plate 25 is set nearly equal to the length of the main body of the wire feeder. They can be also omitted if the front and rear connector portions with the cables E and F are formed so as to lessen the inclination of the wire feeder C when dropped in the groove. Although the welding operation of the deck plate is usually performed in the outdoor, the cover plate 26 can protect the wire feeder C from rain or dust and, the insertion of the electrode wire or the adjustment of wire feeding can be made easily by opening the cover plate 26. This cover plate 26 can be made of a flexible material but desirably made of a rigid material in order to protect the wire feeder from an external force.

If it becomes necessary to lift the wire feeder C up or down to a higher position, a handle CH as shown in FIG. 15 can be mounted in place of the guard member 25.

As is apparent from the mentioned above, the wire feeder C according to the second preferred embodiment can be moved easily on the deck plate P by the aid of the guard member 25. This enhances the efficiency of the welding operation and serves to lessen the fatigue of the operation. Since the lengths of the intermediate and torch cables E and F can be set at several tens, for instance thirty, meters and several, for instance eight, meters, respectively, a reasonably wide working area of a radius, about thirty eight meters in the above example, can be guaranteed even if the main wire feeder B is set fixedly.

Figure 9A:
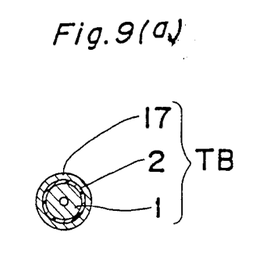
FIGS. 9(a) and 9(b) are sectional views of the torch body assembly of the arc spot welder for showing variations of the present invention.
Figure 9B:
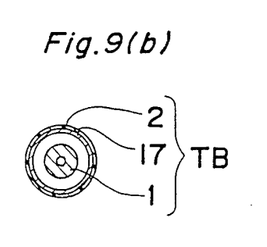

FIGS. 9(a) and 9(b) show variations of the torch body assembly TB shown in FIG. 2, respectively. In the variation shown in FIG. 9(a), the torch body assembly TB is comprised of a main body 1 of torch, an insulation tube 2 covering the main body 1 of torch and a reinforcement 17 covering the insulation tube 2. In the variation shown in FIG. 9(b), the torch body assembly TB is comprised of a main body 1 of torch, a reinforcement 17 arranged coaxially with the main body 1 which has a radius larger than that of the main body 1 and an insulation tube 2 which covers the reinforcement 17. The reinforcement 17 can give a reasonable mechanical strength to the main body 1 and, thereby, the main body 1 can be made to have a minimum radius for electric power supply. Thus, even if the torch body assembly TB is lengthened as shown in FIG. 1, the welding torch T can be made relatively light so as to be able to handle the same easily.

Figures 10A, 10B:
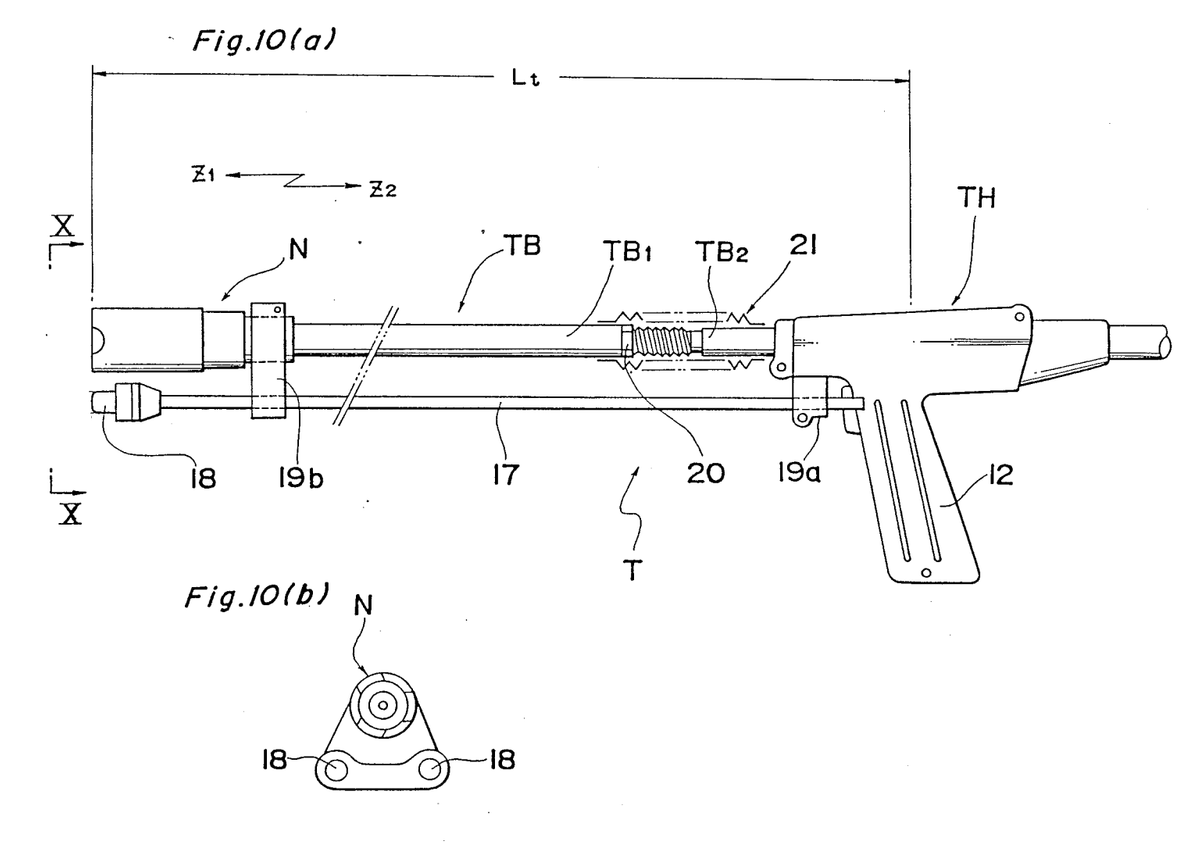
FIG. 10(a) is a front view of the welding torch according to a variation of the present invention.
FIG. 10(b) is an end view of the welding torch shown in FIG. 10(a)

FIGS. 10(a) and 10(b) show a variation of the welding torch shown in FIG. 2.

In this variation, a torch body 1 ( of the torch ) is comprised of a first member $TB_1$ and a second member $TB_2$ and the first and second members $TB_1$ and $TB_2$ are connected by a threaded rod so as to be adjustable in the axial direction of the torch body assembly TB. The first and second members $TB_1$ and $TB_2$ are fixed to each other by fastening a nut 20 after adjusting the distance therebetween. The connection portion of the torch body assembly is covered by a bellows 21 made of an elastic material.

Portions of the first and second members not covered are covered by insulation members, respectively.

The welding torch T further comprises reinforcement rods 17 and 17 extending parallel to the torch body assembly each of which has a contact element 18 at a free end thereof.

Each reinforcement rod 17 is bridged between a support element 19a fixed to the holder assembly TH and a support element 19b mounted on the base of the nozzle assembly N and is adjusted and fixed so as for the tip end of the contact element 18 to position at the same level as of the tip end of the nozzle assembly N.

According to the welding torch T mentioned above, it becomes possible to adjust the height thereof so as to match to the height of an operator and the reinforcement rods 17 and 17 with contact elements 18 and 18 contribute to support the welding torch stably upon the welding operation. Though it is also possible to provide one reinforcement rod 17, it becomes necessary to avoid possible interference between the tip end of the reinforcement rod 17 and the holder assembly TH. Further, it is also possible to omit the portion of the reinforcement rod 17 defined between the support elements 19a and 19b. In the case, the tip end portions extending from the support element 19b should be left as it is since they contribute to stabilize the posture of the welding torch T.

Figures 11A, 11B:
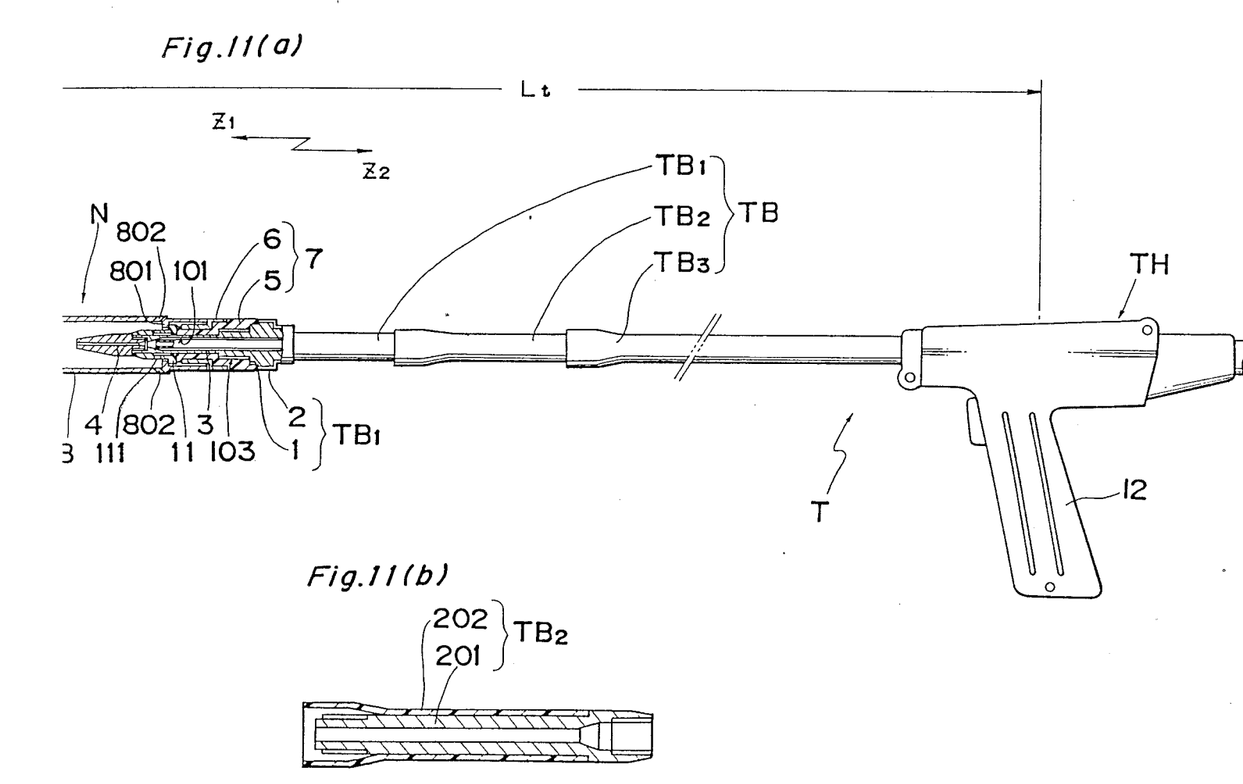
FIG. 11(a) is a front view of the welding torch according to another variation of the present invention.
FIG. 11(b) is an enlarged sectional view of a portion of the torch body assembly shown in FIG. 11(a)

FIGS. 11(a) and 11(b) show a variation of the welding torch T shown in FIG. 2.

In this variation, the torch body assembly TB is comprised of first to third torch body element $TB_1$ to $TB_3$ covered with insulation tube which are connected in the axial direction successively. According thereto, the height of the welding torch can be adjusted corresponding to the height of an operator by selecting one among the second torch body elements $TB_2$ having various lengths or by connecting one more torch body element between the second and third torch body elements $TB_2$ and $TB_3$.

As shown in FIG. 11(b), the second torch body element $TB_2$ is comprised of a rod element 201 having a through hole and an insulation tube 202 covering the rod element 201 except for one tip end portion to be inserted into the third torch body element $TB_3$. At the other end of the second torch body element $TB_2$, there is provided an insertion gap for accepting the tip end of the first torch body element $TB_1$.

As shown in FIG. 11(a), the insulation cylinder 7 is comprised of an inner cylinder 5 made of an insulative material and an outer cylinder 6 made of a metal formed integrally to the inner cylinder 5 and is detachably mounted onto the torch body 1. The nozzle 8 is detachably mounted onto the insulation cylinder 7. In this case, since the baffle 11 is supported by the power supply element 4, only the nozzle 8 can be dismounted irrespectively of the power supply element 4. Further, it is desirable to perforate small holes 802 at positions lower than the bottom wall 801 of the nozzle 8, in other words, at positions between the bottom wall 801 and the gas spouting hole 111 of the baffle 11.

This structure enables and operator to observe the state of adhesion of sputters more clearly and is more convenient for removing adhered sputters.

Figure 12:
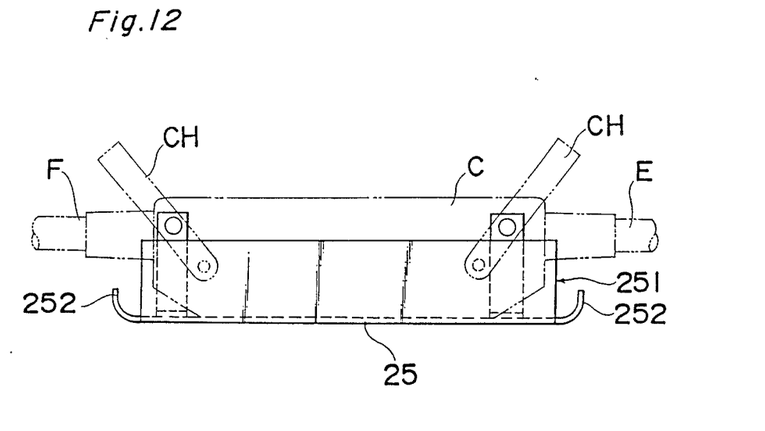
FIG. 12 is a front view of the second wire feeder according to a variation of the second preferred embodiment of the present invention.
Figure 13:
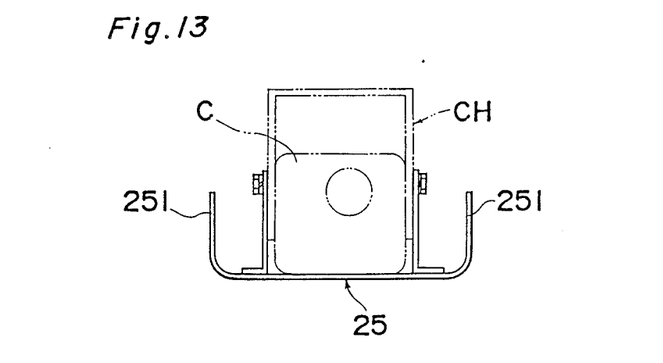
FIG. 13 is a side view of the second wire feeder shown in FIG. 12, FIGS. 14 and 15 are perspective views of conventional arc spot welders, respectively.

FIGS. 12 and 13 show a variation of the wire feeder C of the torch side as shown in FIGS. 6 and 7. In this variation, handles CH are mounted on side walls of the main body of the wire feeder C thereof using screws in such a manner that the guard member 25 can be dismounted from the main body of the wire feeder C thereof without dismounting them. A water proof cover (not shown) can be provided also in this case.

Further, it is possible to contain the wire feeder C of the torch side in a space formed between the guard member 25 and the water proof cover.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An arc spot welding apparatus comprising a welding power supplying unit, a wire feeder connected to the welding power supplying unit by a control cable and an arc spot welding torch connected to the wire feeder by a torch cable which is operable by operating an operation switch arranged on a holder thereof to be held by an operator, said apparatus being characterized in that the welding torch is comprised of a nozzle assembly including a power supply element for supplying electric power to a consumable electrode wire being fed in an axial direction thereof, a baffle having holes for spouting shielding gas and a nozzle surrounding said power supply element, said baffle and said consumable electrode wire, a torch holder assembly being provided with the operating switch which is operable by an operator while holding said torch holder assembly, a torch body assembly for connecting said nozzle assembly and said torch holder assembly which is formed so as to have a length defined as the distance between a tip end of the nozzle of said nozzle assembly and a holder portion of said torch holder assembly equal to or longer than 650 mm whereby the operator can operate said welding torch in a standing posture;
wherein said nozzle assembly includes at least one small hole which connects inner and outer spaces of said nozzle assembly at the bottom portion thereof.

2. Arc spot welding apparatus as claimed in claim 1, in which said small hole is formed inclined to the axis of said nozzle assembly.

3. An arc spot welding apparatus comprising a welding power supplying unit, a main wire feeder connected to the welding power supplying unit by a control cable, an additional wire feeder connected to the main wire feeder by an intermediate cable and an arc spot welding torch connected to the additional wire feeder by a torch cable which is operable by operating an operation switch arranged on a holder thereof to be held by an operator, said apparatus being characterized in that the welding torch is comprised of a nozzle assembly including a power supply element for supplying electric power to a consumable electrode wire being fed in an axial direction thereof, a baffle having holes for spouting shielding gas and a nozzle surrounding said power supply element, said baffle and said consumable electrode wire, a torch holder assembly being provided with the operating switch which is operable by an operator while holding said torch holder assembly, a torch body assembly for connecting said nozzle assembly and said torch holder assembly which is formed so as to have a length defined by the distance between a tip end of the nozzle of said nozzle assembly and a holder portion of said torch holder assembly equal to or longer than 650 mm whereby the operator can operate said welding torch in a standing posture;

wherein said nozzle assembly provides at least one small hole which connects inner and outer spaces of said nozzle assembly at the bottom portion thereof and wherein said additional wire feeder provides a detachable guard member having a wide bottom plate portion and rising portions formed along respective edges of said wide bottom portion.

4. Arc spot welding apparatus as claimed in claim 3 in which at least one small hole is arranged on the bottom portion of said nozzle and is formed inclined to the axis thereof.

5. Arc spot welding apparatus as claimed in claim 3, in which a water proof cover is mounted to said guard operably to open and close.

* * * * *